United States Patent [19]

Nagaishi

[11] Patent Number: 5,228,336

[45] Date of Patent: Jul. 20, 1993

[54] ENGINE INTAKE AIR VOLUME DETECTION APPARATUS

[75] Inventor: Hatsuo Nagaishi, Kanagawa, Japan

[73] Assignee: Nissan Motor Co., Ltd., Yokohama, Japan

[21] Appl. No.: 820,227

[22] Filed: Jan. 14, 1992

[30] Foreign Application Priority Data

Jan. 18, 1991 [JP] Japan .................. 3-72227
Jan. 25, 1991 [JP] Japan .................. 3-25454

[51] Int. Cl.$^5$ ........................................ G01M 15/00
[52] U.S. Cl. ........................... 73/118.2; 123/488
[58] Field of Search .................. 73/118.2, 117.3; 123/488, 492

[56] References Cited

U.S. PATENT DOCUMENTS

4,873,641 10/1989 Nagaishi et al. .................. 123/492 X

FOREIGN PATENT DOCUMENTS

3-111639 5/1991 Japan .

*Primary Examiner*—Jerry W. Myracle
*Attorney, Agent, or Firm*—Foley & Lardner

[57] ABSTRACT

This invention concerns an apparatus for detecting a cylinder intake air volume based on the output of an air flow meter installed in an intake manifold. The apparatus determines a weighting average coefficient from predetermined calculation equations, and calculates the weighted average of the output of the air flow meter based on this weighting average coefficient so as to detect the actual cylinder air intake volume. Since the weighting average coefficient is determined from calculation equations and not from a map, the detection of the cylinder intake air volume is simple and precise irrespective of the type of engine. When applied to AFR control systems of an engine, it is preferable to correct the weighted average based on a variation rate of the weighted average when the engine is not running under predetermined high load conditions. AFR control can therefore be performed with accurate timing.

6 Claims, 11 Drawing Sheets

ENGINE INTAKE AIR VOLUME DETECTION APPARATUS

FIELD OF THE INVENTION

This invention relates to an apparatus for detecting the air volume aspirated into an engine cylinder.

BACKGROUND OF THE INVENTION

In an L-Jetronix type fuel injection apparatus provided with a fuel injector in the vicinity of each cylinder, the intake air volume aspirated in each cylinder is detected by an air flow meter provided in an intake manifold, and a basic injection pulse width Tp of the fuel injector is determined from this intake air volume Qa and the engine speed Ne detected by the crank angle sensor or other means using the following equation:

$Tp = K \cdot Qa/Ne$ (K is a constant)

However, due to the distance between the air flow meter and a cylinder, and the capacity of the intake manifold, the air flowrate aspirated into the cylinder does not immediately follow increases and decreases at the position of the air flow meter but follows them after a certain delay.

In order to make the fuel injection amount correspond accurately to the actual cylinder intake air volume, a fuel injection control apparatus wherein fuel injection is performed based on a weighted average value Avtp is disclosed in, for example, Tokkai Hei 3-111639 published by the Japanese Patent Office. In this publication the weighted average value Avtp is calculated by the following equation:

$$Avtp = Tp \cdot Fload + old\ Avtp \cdot (1 - Fload) \quad (1)$$

where Fload is a weighting average coefficient which specifies the aforesaid delay. Further, the term "old" in the equation represents a value obtained by the immediately preceding calculation.

In the aforesaid apparatus, variations of the cylinder intake air volume are predicted by repeatedly computing equation (1) with a certain time period. Discrepancies between the air flowrate detected by the air flow meter and the cylinder air intake volume are particularly apt to occur during transient engine running states. If fuel injection is performed according to the cylinder air intake volume predicted as described hereinabove, however, the air-fuel ratio (AFR) of the air-fuel mixture which is actually burnt can be accurately controlled to a target value.

Fload is determined by previously setting up a map depending on the engine speed Ne and engine load, and referring to this map each time the calculation is performed. To determine the engine load, data for throttle opening TVO or the like may be used.

To increase the accuracy of correspondence between fuel injection amount and cylinder air intake volume in the aforesaid apparatus, the number of grid points on the map must be increased. The map is however set up by carrying out experiments on each type of engine, and a large operating time is consequently required to set up a map having the requisite precision.

Further, if the time required to compute Tp by detecting Qa using the air flow meter is long, a difference appears between the phase of Avtp found by applying a weighted average to the computed value of Tp and the phase of the actual air volume aspirated in the cylinder. As a result, during acceleration for example, the increase of Avtp is delayed so that the first part of the fuel injection amount tends to be insufficient, and the subsequent overshoot causes the later part of the fuel injection amount to be excessive.

SUMMARY OF THE INVENTION

It is therefore an object of this invention to provide an engine intake air volume detection apparatus which does not require a map set up by calculating the weighting average coefficient Fload from an equation.

It is moreover a further object of this invention to compensate for the various delays inherent in detecting the intake air volume, and detect the cylinder air intake volume with good timing.

In order to achieve the above objects, this invention provides an intake air volume detection apparatus for an engine provided with a cylinder, an intake manifold for guiding air into the cylinder and a throttle valve installed in the intake manifold for regulating an intake air volume in the cylinder. This apparatus comprises an air flow meter installed upstream of the throttle valve in the intake manifold for detecting an air flowrate in the intake manifold, means for calculating the cylinder intake air volume per engine revolution at a predetermined interval from the air flowrate detected by the air flow meter, means for calculating a weighting average coefficient Fload, means for calculating a weighted average volume based on the intake air volume per engine revolution, the weighting average coefficient Fload and the weighted average volume calculated in the immediately preceding calculation cycle, and means for outputting the value calculated by the weighted average volume calculating means as an actual cylinder intake air volume per engine revolution.

Either of the following equations is applied for the calculation of Fload:

$$Fload = 1/\{(120 \cdot Vm/(Ve \cdot \eta \cdot Ne \cdot \Delta t) + 1\}$$

$$Fload = (Ve \cdot \eta \cdot Ne \cdot \Delta t)/(120 \cdot Vm)$$

wherein:
$\Delta t$ = calculation interval of air volume supplied to cylinder
$Vm$ = capacity of intake manifold
$Ve$ = engine displacement
$\eta$ = new air proportion in cylinder
$Ne$ = engine speed, and Instead of the outputting means aforementioned, the apparatus may comprise means for correcting the value calculated by the weighted average volume calculating means based on a difference between this value and the value calculated in the immediately preceding calculation cycle, means for detecting engine load, means for judging whether or not the detected engine load is a high load equal to or above a predetermined constant, and means for outputting the value calculated by the weighted average volume calculating means as an actual cylinder intake air volume per engine revolution if it is judged that the engine load is high load, and for outputting the value corrected by the correcting means as the actual cylinder intake air volume per engine revolution if it is judged that the engine load is not high load.

Instead of the outputting means aforementioned, the apparatus may also comprise means for correcting the value calculated by the weighted average volume calculating means based on a difference between this value and the value calculated in the immediately preceding calculation cycle, means for detecting engine load, means for judging whether or not the detected engine load is a high load equal to or above a predetermined constant, means for comparing the value calculated by the weighted average volume calculating means and the cylinder intake air volume per engine revolution, and means for outputting the value calculated by the weighted average value calculating means as the actual intake air volume per engine revolution if it is judged that the engine load is high load and that the value calculated by the weighted average value calculating means is greater than the intake air volume per engine revolution, and outputting the value corrected by the correcting means as the actual intake air volume per engine revolution in all other cases.

DESCRIPTION OF THE PREFERRED EMBODIMENTS

Figure 1:
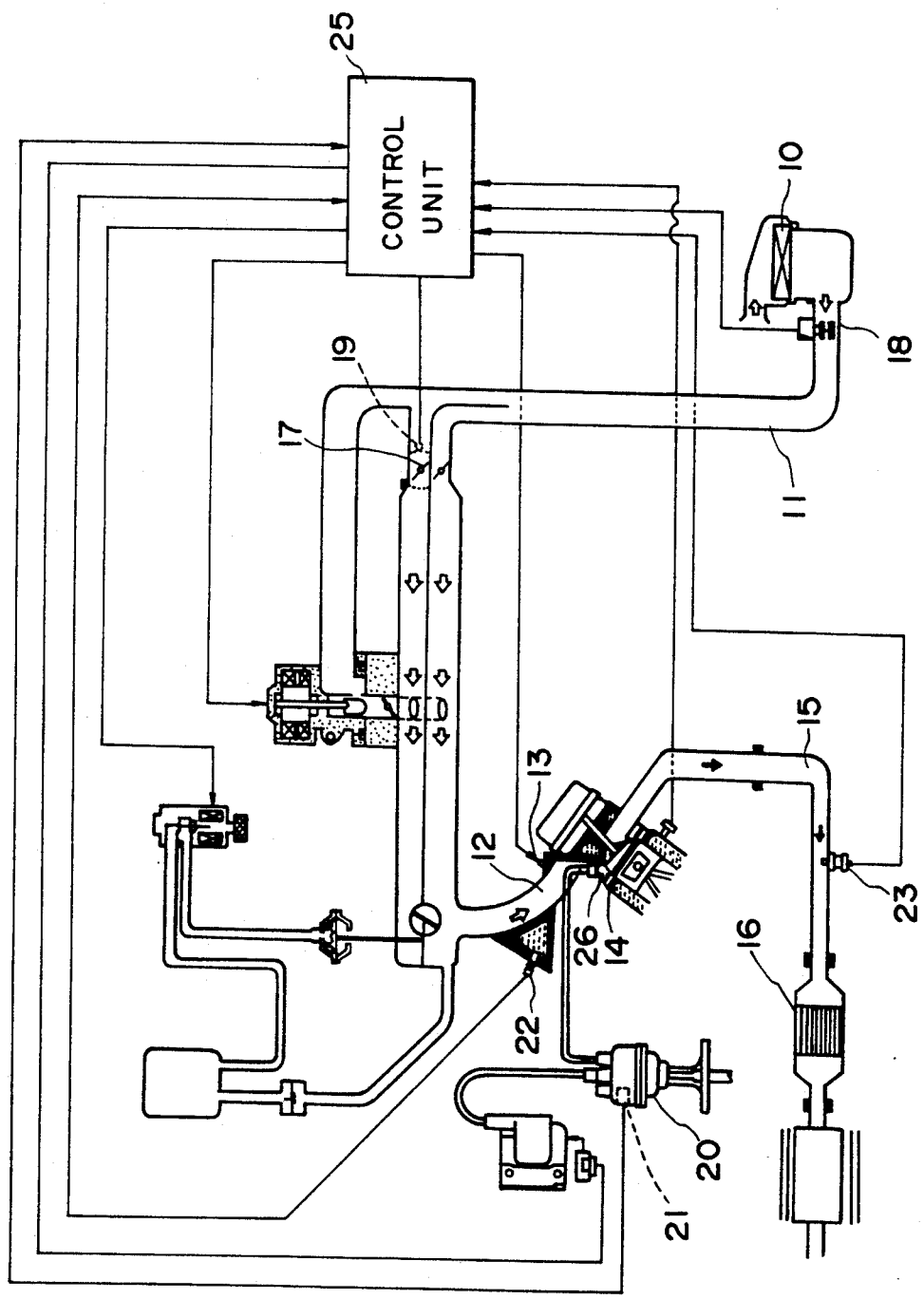
FIG. 1 is a schematic diagram of a fuel injection control system of an engine including a cylinder intake air detection apparatus according to this invention.

FIG. 1 shows an L-Jetronix type fuel injection control system wherein an air volume detection apparatus of this invention is applied.

In this figure, air aspirated through an intake manifold 11 from an air cleaner 10 is mixed with injected fuel from a fuel injector 13 in an intake port 12, and is thence guided to an engine cylinder 14.

This mixed gas is ignited by a spark plug 26 in the cylinder 14, and burnt. After a piston has been depressed by the combustion pressure, the burnt gas is guided via an exhaust passage 15 to a catalyst converter 16 which removes harmful components such as CO, HC and NOx.

When the accelerator pedal is depressed, a throttle value 17 provided in the intake manifold 11 opens, and the air volume flowing into the cylinder 14 increases. This variation of air volume causes a variation of the output signal of an air flow meter 18 installed upstream of the throttle valve 17. This air flow meter 18 consists of a sensor and control circuit. In the sensor, a heating wire is wound in the form of a coil on a ceramic bobbin, the whole of the sensor being covered with a glass coating.

A bridge circuit is provided between the control circuit and heating wire. The heating wire of the sensor is cooled the more the air flowrate increases, and the value of current supplied to the heating wire is therefore increased according to the air flowrate so as to maintain the wire temperature constant. The control circuit converts the current value to a voltage value and outputs it.

The control unit 25 comprises mainly a microcomputer. Signals from a sensor 19 for detecting a throttle valve opening TVO, a crank angle sensor 21 (installed in a distributor 20) which generates a pulse signal in synchronism with the rotation of engine crankshaft, a water temperature sensor 22 which detects the temperature of engine coolant water, and an oxygen sensor 23 which detects the oxygen concentration in the exhaust gases, are supplied to the control unit 25. The control unit 25 calculates the intake air volume of the cylinder 14 from the output of the air flow meter 18, determines a fuel injection amount based on this volume such that a desired AFR is obtained, and outputs this information as a fuel injection pulse to the fuel injector 13.

Due to the capacity of the intake manifold 11, when the engine is in a transient state such as acceleration for example, the air flow volume at the fuel injector 13 is not identical to the air flow volume at the air flow meter 18, hence the pulse width of the fuel injection signal supplied to the fuel injector 13 must be arranged to be proportional to the air volume flowing where the fuel injector 13 is situated, i.e. in the vicinity of the cylinder 14. The control unit 25 calculates a weighted average pulse width Avtp (ms) from the aforesaid equation (1) using the basic pulse width Tp (ms) determined from the output of the air flow meter 18 and engine speed Ne, and using the weighting average coefficient Fload (%).

The basic pulse width Tp directly corresponds to the output of the air flow meter 18, and the weighted average pulse width Avtp corresponds to the actual intake air volume in the cylinder 14.

Figure 3:
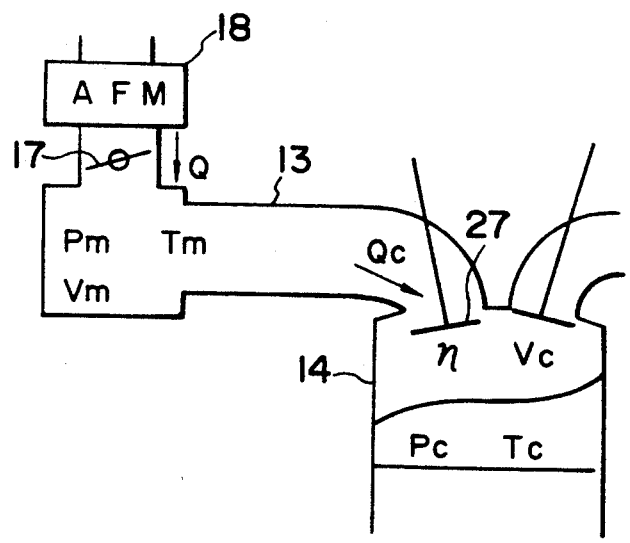
FIG. 3 is a schematic diagram of an air intake system illustrating symbols used in a calculation equation according to this invention.

According to this invention, the weighting average coefficient Fload is found by calculation from an equation determined by the schematic diagram in FIG. 3. A description is given as follows.

The difference Q−Qc between the air volume Q flowing through the throttle valve 17 and the air volume Qc flowing into the cylinder 14 corresponds to the amount of variation of air volume in the intake manifold 11, and it is proportional to the pressure variation in the intake air manifold 11. This is represented by the following equation:

$$Q - Qc = Vm \cdot \rho \cdot \{\Delta(Pm/Tm)/\Delta t\} \cdot \{60 \cdot 2)/(Ne/Cyl)\} \quad (11)$$

wherein:
Q = air flowrate through the throttle valve 17 (g/s)
Qc = air flowrate into the cylinder 14 (g/s)
Vm = capacity of the intake manifold 11 (cc)
$\rho$ = air density (g/cm³)
Pm = pressure in intake manifold 11
Tm = intake air temperature in intake manifold (K)
$\Delta t$ = calculation interval of Qc (s)
Ne = engine speed (rpm)
Cyl = number of engine cylinders On the other hand, at a predetermined crankshaft angle when the throttle valve 27 is closed in FIG. 3:

$$Qc = Vc \cdot \rho \cdot \eta \cdot (Pc/Tc) \quad (12A)$$

$$Pc/Tc \approx Pm/Tm \quad (12B)$$

wherein:
Vc = volume of cylinder (cc)
Tc = intake air temperature in cylinder (K)
$\eta$ = new air proportion in cylinder (%)
Pc = pressure in cylinder From (12A) and (12B), the amount of variation in unit time can be obtained:

$$\Delta(Pm/Tm) \approx \Delta Qc/(Vc \cdot \rho \cdot \eta) \quad (13)$$

Substituting for $\Delta(Pm/Tm)$ in equation (11) from equation (13):

$$\begin{aligned} Q - Qc &= \Delta Qc \cdot \{(60 \cdot 2 \cdot Vm)/(Vc \cdot \eta \cdot Ne \cdot Cyl \cdot \Delta t)\} \\ &= \Delta Qc \cdot Kf \end{aligned} \quad (14)$$

wherein:

$$Kf = (60 \cdot 2 \cdot Vm)/(Vc \cdot \eta \cdot Ne \cdot Cyl \cdot \Delta \# t)$$

As $\Delta Qc = Qc - \text{old } Qc$, equation (14) may be written:

$$Qc = Q \cdot 1/(Kf+1) + \text{old } Qc \cdot Kf/(Kf+1) \quad (15)$$

Figure 4:
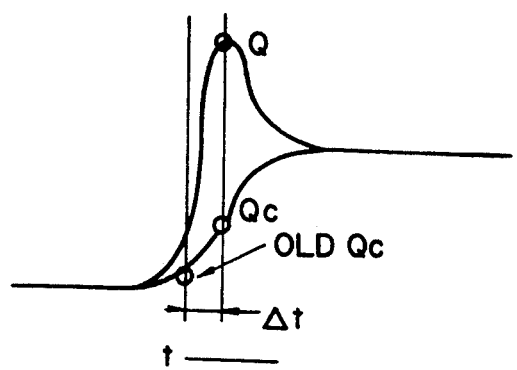
FIG. 4 shows a waveform of a flowrate variation during acceleration according to the diagram of FIG. 3.

Writing Fload = 1/(Kf + 1), we have:

$$1/(Kf+1) + Kf/(Kf+1) = 1,$$

hence equation (15) becomes:

$$Qc = Q \cdot Fload + \text{old } Qc \cdot (1 - Fload) \quad (16)$$

which is the well-known weighted average equation. FIG. 4 shows the relation between these three values (Qc, Q, old Qc) for the case of acceleration. The weighting average coefficient Fload in this case is given by:

$$\begin{aligned} Fload &= 1 \cdot (Kf + 1) \\ &= 1/\{(120 \cdot Vm)/(Ve \cdot \eta \cdot Ne \cdot \Delta t) + 1\} \end{aligned} \quad (17)$$

wherein: Ve = exhaust gas amount = Vc·Cyl.

Equation (17) shows that the weighting average coefficient Fload can be calculated from a theoretical equation. To calculate Fload from this theoretical equation, it is sufficient to know Vm and Ve which are part of the engine specification, and $\Delta t$ which is part of the specification of the microcomputer of the control unit 25. The equation can therefore be easily applied to different engines, and Avtp may also be found with high precision from Fload calculated by the equation.

The new air proportion $\eta$ in the cylinder 14 which is required for the aforesaid computation, is calculated using the following approximation. $\eta$ depends on and is determined by an engine load corresponding amount and the engine speed:

$$\eta = \eta b + (1 - \eta b) \cdot \eta b \quad (18)$$

wherein $\eta b$ is the load dependence fraction of the new air proportion. As the engine load corresponding amount, the air flow Qho through the throttle valve 17 in the steady state is used. Qho is determined by the opening TVO of the throttle valve 17 and the engine speed Ne.

There are two reasons why Avtp is not used as the engine load corresponding amount. Firstly, Avtp is affected by atmospheric pressure and intake air temperature. Secondly, if Avtp is used, only data from the immediately preceding computation can be employed which gives rise to a delay. To avoid this delay, Avtp and Fload must be calculated twice, and this results in a longer computation time for $\eta$.

Figure 9:
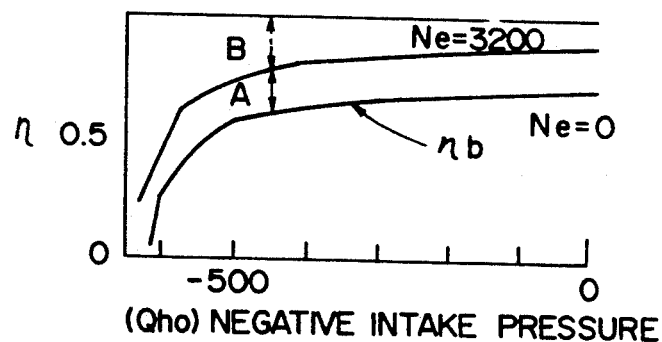
FIG. 9 is a graph illustrating a method of calculating a new air proportion $\eta$ in the cylinder.
Figure 10:
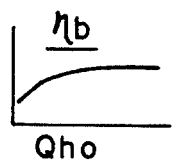
FIG. 10 is a graph showing the characteristics of a load dependence fraction $\eta b$ of the new air proportion $\eta$.
Figure 11:
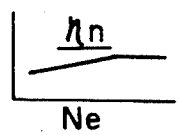
FIG. 11 is a graph showing the characteristics of a rotation correction factor $\eta n$.

$\eta$ also varies according to the engine speed Ne as shown in FIG. 9. A speed correction factor $\eta n$ is therefore introduced, and the basic value of $\eta$ is $\eta b$ (value when Ne = 0). In FIG. 9, $A/(A+B) = \eta n$. $\eta b$ and $\eta n$ are given by a table containing the data shown in FIG. 10 and FIG. 11.

Another method of finding $\eta$ is to draw a map of $\eta$ with the engine load corresponding amount Avtp or Qho and engine speed as parameters, and referring to it directly.

Figure 2:
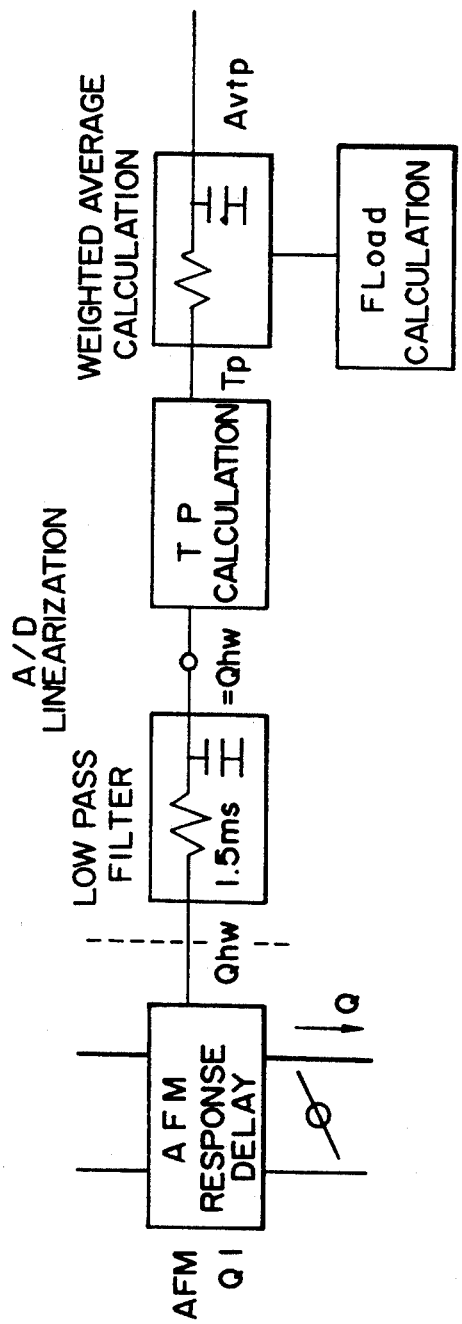
FIG. 2 is a block diagram describing the response delay in the cylinder intake air detection apparatus according to this invention.

Further in this embodiment, to compute the cylinder intake air volume with high precision, the time constant of the low pass filter for the air flow meter which eliminates high frequency noise accompanying ignition, for example, is set equal to the low value of 1.5 ms as shown in FIG. 2.

Figure 5:
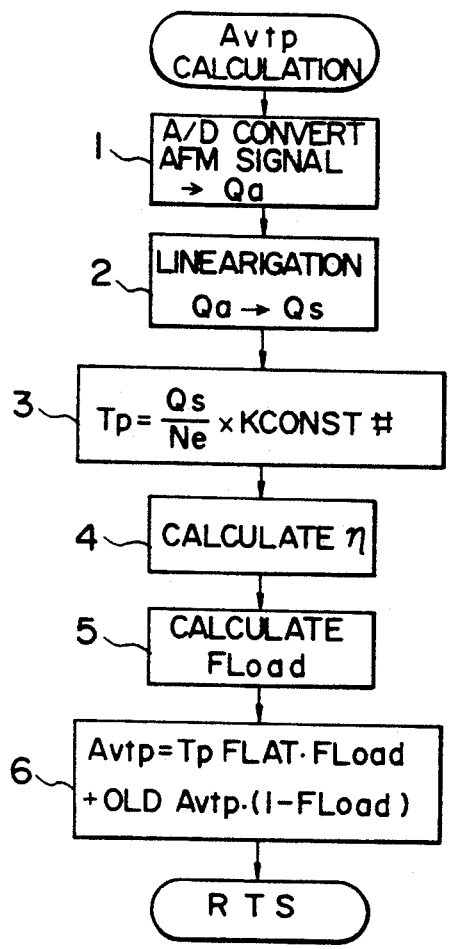
FIG. 5 is a flowchart describing a control process of a control unit according to this invention.

FIG. 5 shows a routine for calculating the pulse width Avtp corresponding to the cylinder intake air volume. This routine is executed at fixed intervals, for example every 4 ms.

Figure 8:
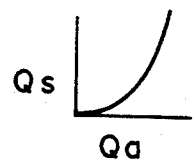
FIG. 8 is a graph illustrating a linear size processing of an output signal of an air flow meter according to this invention.

In a step 1, a signal from the air flow meter 18 is subjected to A/D conversion. In a step 2, linearization processing is performed such that the A/D conversion value Qa is proportional to the air volume, and the processed value Qs is input to a memory. FIG. 8 shows the characteristics used for linearization processing.

A basic injection pulse width Tp (ms) is then computed by the following equation from this linearized air volume Qs (g/s) and the engine speed Ne (step 3):

$$Tp = (Qs/Ne) \cdot KCONST\# \quad (19)$$

In equation (19), Qs/Ne is an intake air volume per unit engine rotation at the installation point of the air flow meter 18, and KCONST# is an air volume pulse width conversion constant.

This basic injection pulse width Tp is also corrected by the following equation:

$$Tpflat = Tp \cdot Ktrm$$

wherein Ktrm is a coefficient for correcting air volume or fuel injector errors for different engine running states, and "trm" refers to trimming. The trimming coefficient Ktrm is found by referring to a map with the engine speed Ne and steady state flowrate Qho of the throttle valve 17 as parameters, and performing an interpolation.

Figure 6:
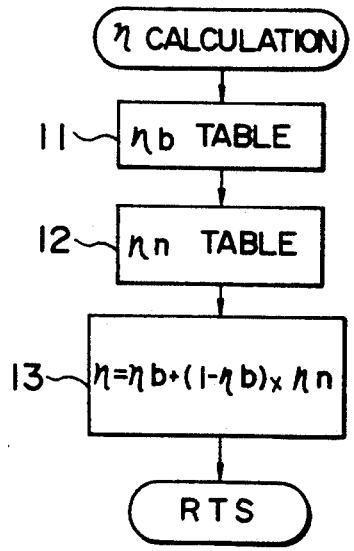
FIG. 6 is a flowchart describing in further detail the calculation of $\eta$ in FIG. 5.

In a step 4, the new air proportion $\eta$ is calculated using equation (18). FIG. 6 shows the calculation process as follows:

$\eta$b and $\eta$n are found by looking up the $\eta$b table from the steady state flowrate Qho through the throttle valve 17 in a step 11, looking up the $\eta$n table from the engine speed Ne in a step 12, performing interpolation calculations respectively.

The calculated values of $\eta$b and $\eta$n are then substituted into equation (18) so as to calculate $\eta$ a step 13.

After calculating $\eta$, the program returns to the routine of FIG. 5, then $\eta$ and the engine speed Ne are substituted into equation (17) so as to calculate the weighting average coefficient Fload.

If the calculation of equation (17) takes time, the following approximation may also be used:

$$Fload = Cfl \cdot (1 - Cfl \cdot GCFL\#) \quad (20)$$

$$Cfl = (Ve \cdot \eta \cdot Ne \cdot \Delta t)/(120 \cdot Vm) \quad (21)$$
$$= \eta \cdot Ne \cdot VOLR\#$$

wherein:
Cfl = approximated value of Fload
GCFL# = correction coefficient of Cfl
VOLR# = coefficient corresponding to (engine displacement/capacity of intake manifold)

As the equations (20) and (21) do not include division, the calculation time in the CPU can be reduced accordingly. If (Ve/Vm) < 1.5, the error of the approximation is within ±1.5% which presents no problem in practice. To simplify the calculation further, it is possible to write:

$$Fload = Cfl$$

Figure 7:
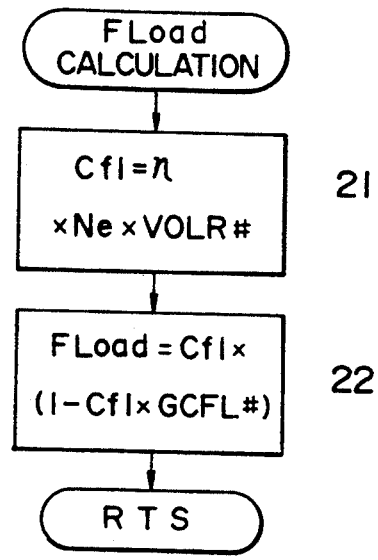
FIG. 7 is a flowchart describing in further detail the calculation of Fload in FIG. 5.

In this case, GCFL# (approx. 0.8) and VOLR# are previously set. As shown in FIG. 7, in a step 21, the value of $\eta$ and Ne are substituted in equation (21) so as to find an Fload approximated value Cfl. This Cfl is further substituted in equation (22) in a step 22 so as to find the weighting average coefficient Fload.

Subsequently the program returns to FIG. 5, and finally a weighted average pulse width Avtp is determined from the following equation in a step 6:

$$Avtp = Tpflat \cdot Fload + \text{old } Avtp \cdot (1 - Fload) \quad (22)$$

After finding the weighted average pulse width Avtp as described hereintofore, a final fuel injection pulse width Ti (ms) is determined from the following equation and fuel is injected:

$$Ti = Avtp \times Co \times \alpha + Ts$$

wherein Co is the sum of 1 and the correction coefficients, $\alpha$ is an AFR feedback correction coefficient calculated according to the output of the oxygen sensor 23, and Ts is a non-effective pulse width of the fuel injector 13 corresponding to the lifting period of a fuel injection valve up to the start of injection.

Figure 13:
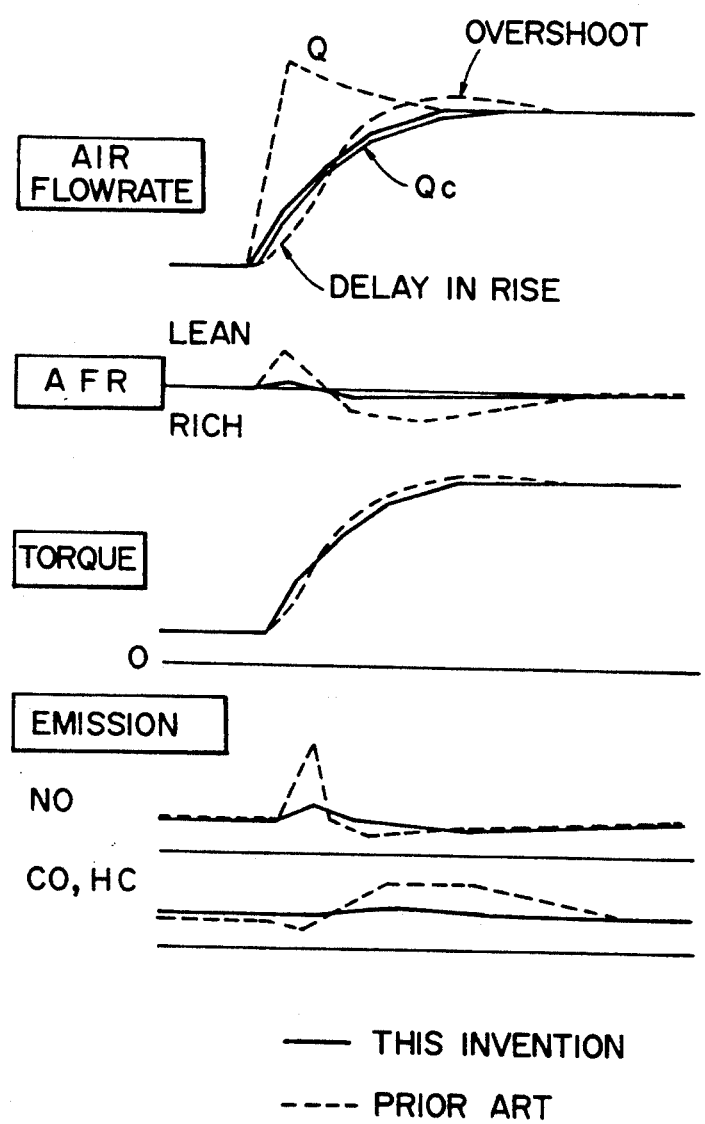
FIG. 13 shows a waveform illustrating the effect during acceleration of this invention.
Figure 14:
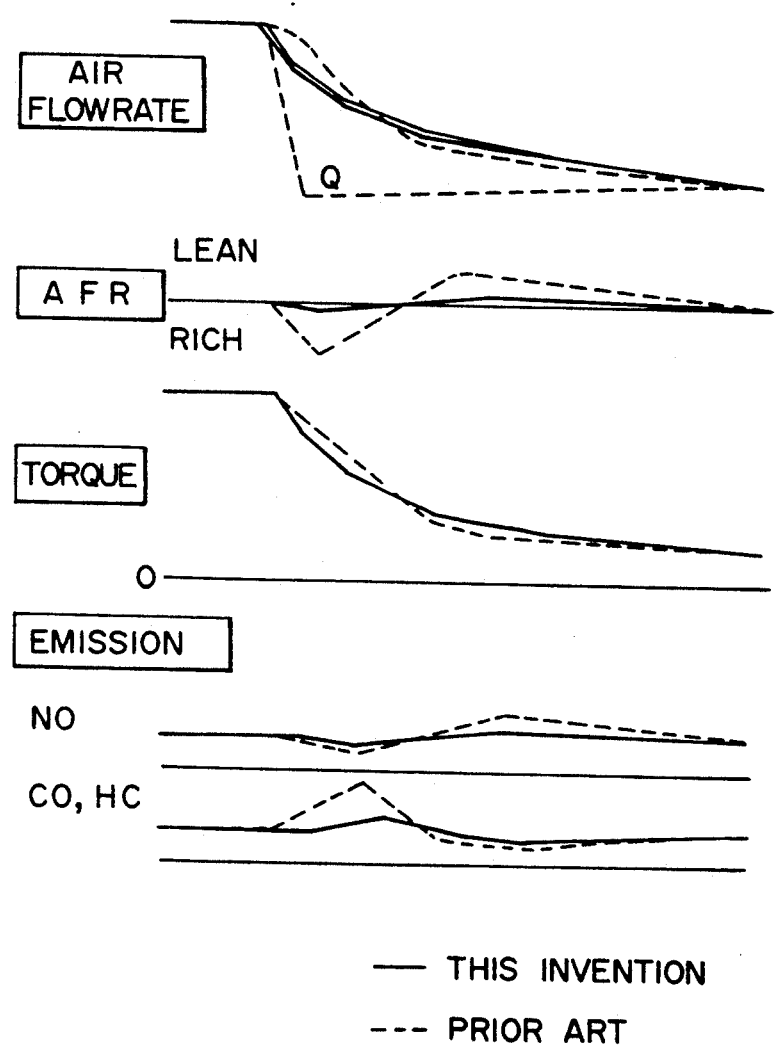
FIG. 14 shows a waveform illustrating the effect during deceleration of this invention.

When AFR control performed using the pulse width Avtp corresponding to the cylinder intake air volume thus calculated, the delay in the rise and overshoot of Avtp during acceleration and the delay in the fall of Avtp during deceleration, too, are greatly reduced as will be appreciated by comparing with analogous delays in the conventional apparatus as shown in FIG. 13 and FIG. 14 which are represented by a broken line.

As a result, the lean spike due to the rise delay and the rich spike due to the fall delay can be reduced, and the rich spike which accompanies overshoot in the latter half of acceleration can also be reduced. Further, as the AFR has substantially flat characteristics, transient driving performance and exhaust emission are also improved.

Figure 12:
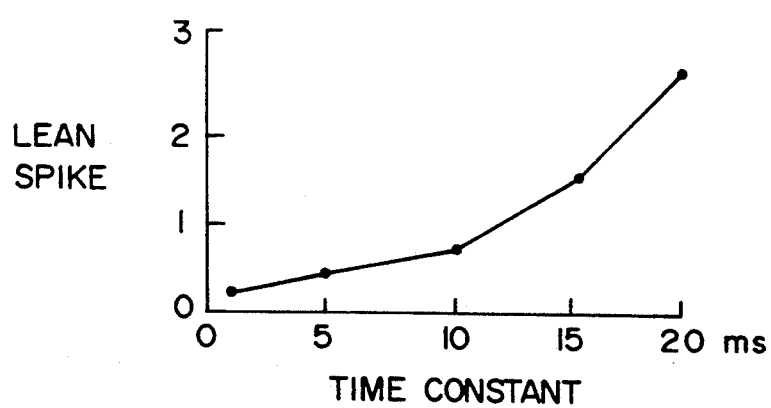
FIG. 12 is a characteristic diagram of lean spike during acceleration.

FIG. 12 shows the effect of the time constant of the low pass filter (FIG. 2) provided in the air flow meter 18 on the lean spike during acceleration. The larger the time constant, the greater the shift towards the lean side. By modifying the time constant so that it is within 10 ms, therefore, the lean spike during acceleration can be improved by one level.

However, a time of approximately 7-10 ms is required from when the control unit 25 outputs a fuel injection signal to the fuel injector 13, to when the injected fuel actually reaches to the cylinder 14, and as a result a phase difference arises during acceleration or other transient states between a variation of fuel supply amount and that of air supply amount to the cylinder 14.

Figure 15:
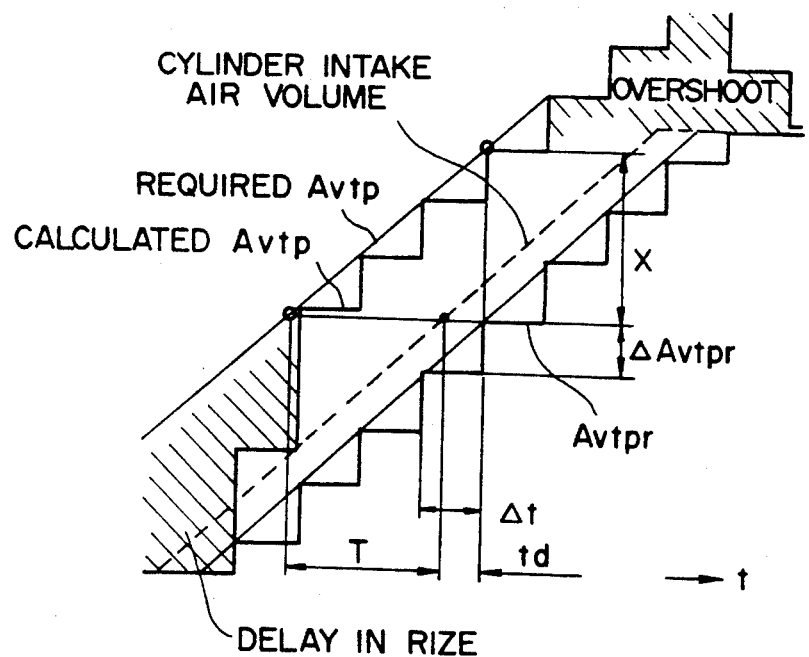
FIG. 15 shows a waveform of Avtp during acceleration according to another embodiment of this invention related to the computation of cylinder intake air volume.
Figure 16:
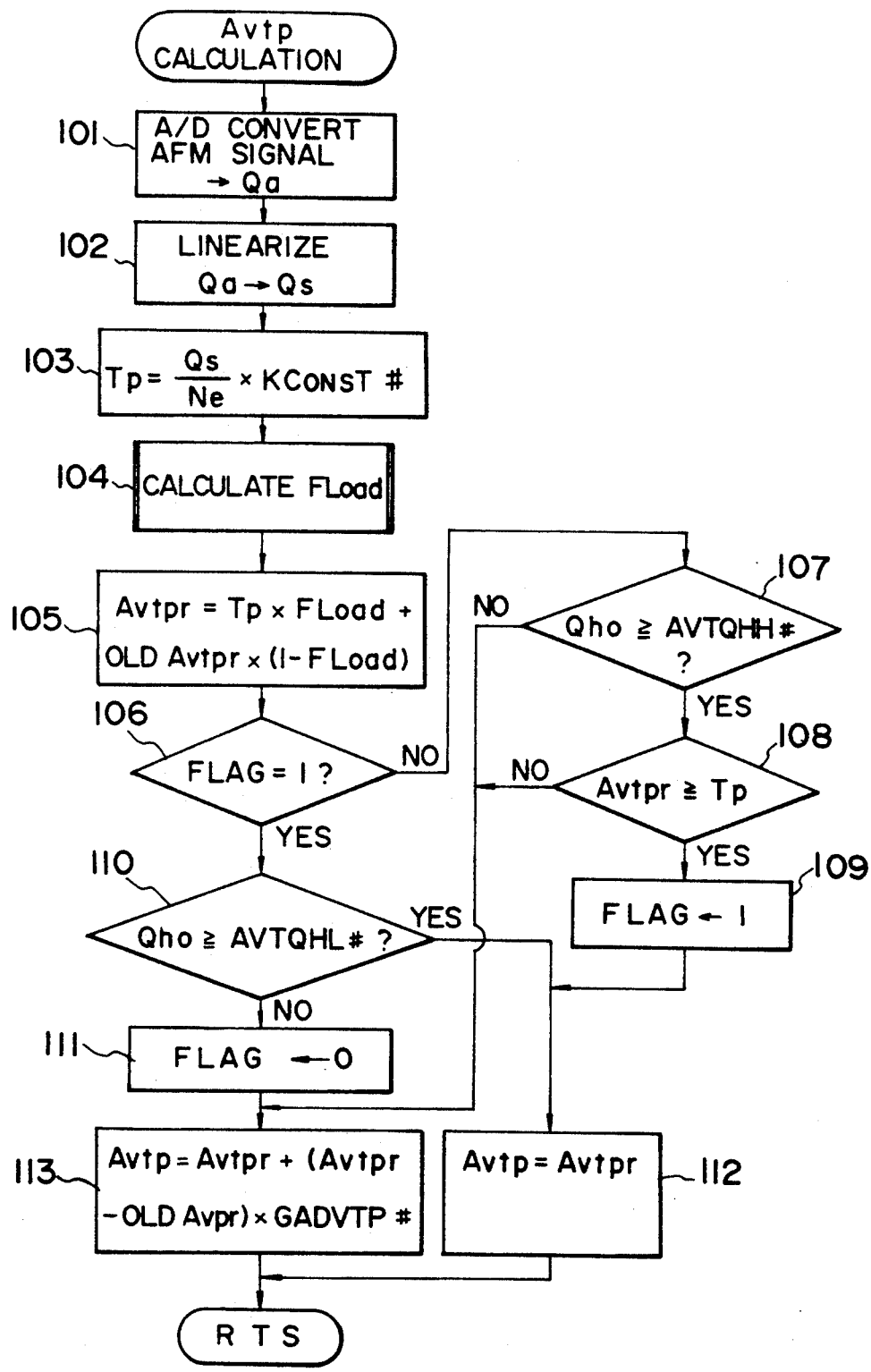
FIG. 16 is a flowchart describing the control process of the control unit according to another embodiment of this invention.
Figure 17:
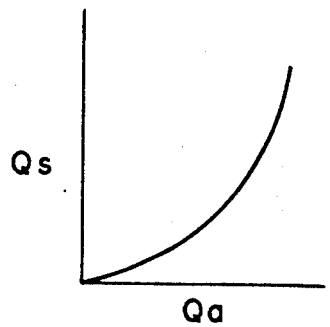
FIG. 17 shows a waveform illustrating the effect due to correction and prohibition of same according to another embodiment of this invention.
Figure 17:
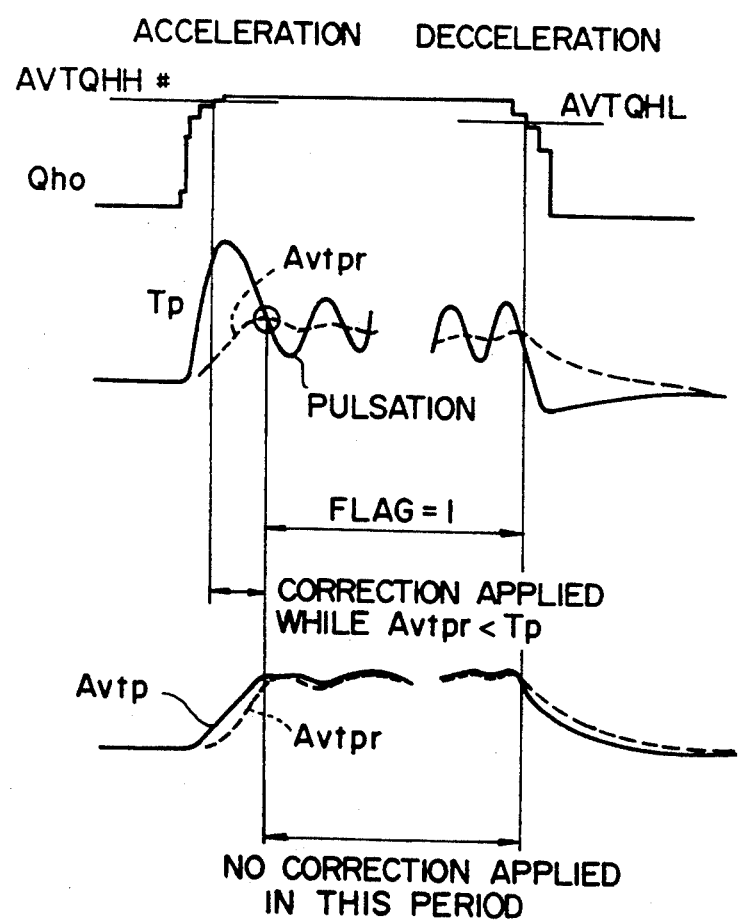

FIGS. 15-17 show another embodiment of this invention which compensates this phase difference. In this case, a rate of variation of Avtp is calculated, and the weighted average of Avtp is subjected to a increasing or decreasing correction based on this rate of variation. This correction is applied only under certain conditions.

FIG. 15 shows the variation of the weighted average pulse width Avtp during acceleration. In the figure, Avtpr is the value of the weighted average of Avtp calculated by equation (1), Advanced Avtp shows the waveform obtained by advancing the phase of this calculated value Avtpr, and Required Avtp shows the Avtp corresponding to the actual air volume supplied to the cylinder at this time.

From this figure, it is desirable that the variation of Avtp is in advance of the cylinder air volume by a correction time T (ms). This relation is expressed by the following equation:

$$Avtp = Avtpr + X \quad (30)$$

$$X/(T + td) = \Delta Avtpr/\Delta t \quad (31)$$

wherein:
$\Delta t$ = calculation interval of Avtpr
$\Delta$Avtpr = variation amount of Avtpr in a time $\Delta t$
td = delay time based on response delay of air flow meter 18 and distance between air flow meter 18 and throttle valve 17 (ms)

Eliminating X from (30), (31):

$$\begin{aligned} Avtp &= Avtpr + \Delta Avtpr \cdot (T + td)/\Delta t \quad (32)\\ &= Avtpr + (Avtpr - \text{old } Avtpr) \cdot (T + td)/\Delta t\\ &= Avtpr + (Avtpr - \text{old } Avtpr) \cdot GADVTP\# \end{aligned}$$

wherein GADVTP# is a correction gain (dimensionless), and td can be considered to be equal to 0 when the air flow meter 18 is situated near the throttle valve 17.

In this case, when for example T=10 ms and Δt=4 ms, GADVTP#=2.5.

As shown by the second term in equation (32), therefore, by adding a correction amount to Avtpr, the delay of the fuel is compensated and Avtp can be approximated to the Requested Avtp even during a gentle acceleration.

If the aforesaid correction is applied, a rising delay and overshoot are produced as shown by the shaded part in the FIG. 15, however provided that the distance between the air flow meter 18 and the throttle valve 17 is within 1.5 m, there is little effect even during a rapid acceleration.

As there are output fluctuations in the reading of the air flow meter 18 due to intake air pulsation, however, the weighted average pulse width Avtp calculated according to the reading of the air flow meter 18 also fluctuates. If this pulsation is large, as when the throttle valve 17 is fully open for example, the weighted average pulse width Avtp fluctuates severely. If the aforesaid correction were applied in such a situation, there is a risk that the fluctuation amplitude would increase and the AFR would become unstable.

The correction is therefore not applied under high load conditions when the output fluctuation is large. High load conditions occur for example when the intake negative pressure downstream of the throttle valve 17 lies within the range −50 mm Hg-0 mm Hg.

On the other hand, when the throttle valve 17 is rapidly opened, the variation of actual cylinder intake air volume is largely delayed with respect to the variation of the intake air volume detected by the air flow meter 18. The correction is therefore applied to the weighted average pulse width Avtpr until Avtpr≧Tp so as to reduce this delay.

The control process of the aforesaid second embodiment will be described with reference to the flowchart of FIG. 16. The steps 101-105, i.e. up to the calculation of Fload, are equivalent to the steps 1-5 of the aforesaid first embodiment. In step 106, the value of a flag is judged. This flag indicates whether or not the correction was performed in the immediately preceding cycle.

If the flag=1, the program proceeds to a step 110, and the normal flowrate Qho is compared with a judgement level AVTQHL# (constant value). This determines whether or not the engine is running under high load. If the relation Qho≧AVTQHL# is not satisfied, the engine is not running under high load, the flag is set to 0, and the correction calculated in the aforesaid equation (32) is applied to the weighted average pulse width Avtpr in a step 113.

If Qho≧AVTQHL#, the engine is running under high load conditions, so Avtp=Avtpr with the flag set equal to 1.

If on the other hand it is determined that the flag=0 in a step 106, it is determined whether or not Qho≧AVTQHH# in a step 107, and if this condition is not satisfied, it is judged that the engine is not running under high load so a correction is performed in a step 113. AVTQHH# is a judgement level arranged to be separate from AVTQHL# in order to confer hysteresis.

If it is judged that Qho≧AVTQHH# in the step 107, it is judged that the engine has shifted to high load so the program proceeds to a step 108.

If the throttle valve is rapidly opened, the average weighting pulse width Avtpr is largely delayed with respect to the load signal Qho. Even if it is judged that the engine is under high load from Qho≧AVTQHH# in the step 107, therefore, the correction is continued provided that Avtpr<Tp.

FIG. 17 shows the variation of the weighted average pulse width Avtp when the throttle valve 17 is rapidly opened and rapidly closed under the control program shown by this flowchart. In the figure, the interval during which the flag=1 is an interval when the basic injection pulse width Tp varies largely corresponding to the output of the air flow meter 18 due to the effect of intake air pulsation. The correction is however prohibited during this interval, so output fluctuations are prevented from being amplified. On the other hand, when Tp is greater than Avtpr, the correction is continued, the delay of Avtpr during acceleration is compensated, and the AFR can be controlled with accurate timing.

The foregoing description of a preferred embodiment for the purpose of illustrating this invention is not to be considered as limiting or restricting the invention, since many modifications may be made by those skilled in the art without departing from the scope of the invention.

The embodiments of this invention in which an exclusive property or privilege is claimed are defined as follows:

1. An intake air volume detection apparatus for an engine provided with a cylinder, an intake manifold for guiding air into the cylinder and a throttle valve installed in said intake manifold for regulating an intake air volume in said cylinder, said apparatus comprising:
   an air flow meter installed upstream of the throttle valve in said intake manifold for detecting an air flowrate in said intake manifold,
   means for calculating the cylinder intake air volume per engine revolution at a predetermined interval from the air flowrate detected by said air flow meter,
   means for calculating a weighting average coefficient Fload based on the equation:

$$Fload = 1/\{(120 \cdot Vm/(Ve \cdot \eta \cdot Ne \cdot \Delta t) + 1\}$$

wherein:
   $\Delta t$ = calculation interval of air volume supplied to cylinder
   $Vm$ = capacity of intake manifold
   $Ve$ = engine displacement
   $\eta$ = new air proportion in cylinder
   $Ne$ = engine speed, and
   means for calculating a weighted average volume based on the intake air volume per engine revolution, the weighting average coefficient Fload and the weighted average volume calculated in the immediately preceding calculation cycle, and
   means for outputting the value calculated by said weighted average volume calculating means as an actual cylinder intake air volume per engine revolution.

2. An intake air volume detection apparatus for an engine provided with a cylinder, an intake manifold for guiding air into the cylinder and a throttle valve installed in said intake manifold for regulating an intake air volume in said cylinder, said apparatus comprising:
   an air flow meter installed upstream of the throttle valve in said intake manifold for detecting an air flowrate in said intake manifold,
   means for calculating the cylinder intake air volume per engine revolution at a predetermined interval from the air flowrate detected by said air flow meter, means for calculating a weighting average coefficient Fload based on the equation:

$$Fload = 1/\{(120 \cdot Vm/(Ve \cdot \eta \cdot Ne \cdot \Delta t) + 1\}$$

wherein:
$\Delta t$ = calculation interval of air volume supplied to cylinder
$Vm$ = capacity of intake manifold
$Ve$ = engine displacement
$\eta$ = new air proportion in cylinder
$Ne$ = engine speed, and means for calculating a weighted average volume based on the intake air volume per engine revolution, the weighting average coefficient Fload and the weighted average volume calculated in the immediately preceding calculation cycle, means for correcting the value calculated by said weighted average volume calculating means based on a difference between this value and the value calculated in the immediately preceding calculation cycle, means for detecting engine load, means for judging whether or not the detected engine load is a high load equal to or above a predetermined constant, and means for outputting the value calculated by said weighted average volume calculating means as an actual cylinder intake air volume per engine revolution if it is judged that the engine load is high load, and for outputting the value corrected by said correcting means as the actual cylinder intake air volume per engine revolution if it is judged that the engine load is not high load.

3. An intake air volume detection apparatus for an engine provided with a cylinder, an intake manifold for guiding air into the cylinder and a throttle valve installed in said intake manifold for regulating an intake air volume in said cylinder, said apparatus comprising:

an air flow meter installed upstream of the throttle valve in said intake manifold for detecting an air flowrate in said intake manifold, means for calculating the cylinder intake air volume per engine revolution at a predetermined interval from the air flowrate detected by said air flow meter, means for calculating a weighting average coefficient Fload based on the equation:

$$Fload = 1/\{(120 \cdot Vm/(Ve \cdot \eta \cdot Ne \cdot \Delta t) + 1\}$$

wherein:
$\Delta t$ = calculation interval of air volume supplied to cylinder
$Vm$ = capacity of intake manifold
$Ve$ = engine displacement
$\eta$ = new air proportion in cylinder
$Ne$ = engine speed, and means for calculating a weighted average volume based on the intake air volume per engine revolution, the weighting average coefficient Fload and the weighted average volume calculated in the immediately preceding calculation cycle, means for correcting the value calculated by said weighted average volume calculating means based on a difference between this value and the value calculated in the immediately preceding calculation cycle, means for detecting engine load, means for judging whether or not the detected engine load is a high load equal to or above a predetermined constant, means for comparing the value calculated by said weighted average volume calculating means and the cylinder intake air volume per engine revolution, and means for outputting the value calculated by said weighted average value calculating means as the actual intake air volume per engine revolution if it is judged that the engine load is high load and that the value calculated by said weighted average value calculating means is greater than the intake air volume per engine revolution, and outputting the value corrected by said correcting means as the actual intake air volume per engine revolution in all other cases.

4. An intake air volume detection apparatus for an engine provided with a cylinder, an intake manifold for guiding air into the cylinder and a throttle valve installed in said intake manifold for regulating an intake air volume in said cylinder, said apparatus comprising:

an air flow meter installed upstream of the throttle valve in said intake manifold for detecting an air flowrate in said intake manifold, means for calculating the cylinder intake air volume per engine revolution at a predetermined interval from the air flowrate detected by said air flow meter, means for calculating the weighting average coefficient Fload based on the equation:

$$Fload = (Ve \cdot \eta \cdot Ne \cdot \Delta t)/(120 \cdot Vm)$$

wherein:
$\Delta t$ = calculation interval of air volume supplied to cylinder
$Vm$ = capacity of intake manifold
$Ve$ = engine displacement
$\eta$ = new air proportion in cylinder
$Ne$ = engine speed means for calculating a weighted average volume based on the intake air volume per engine revolution, the weighting average coefficient Fload and the weighted average volume calculated in the immediately preceding calculation cycle, and means for outputting the value calculated by said weighted average volume calculating means as an actual cylinder intake air volume per engine revolution.

5. An intake air volume detection apparatus for an engine provided with a cylinder, an intake manifold for guiding air into the cylinder and a throttle valve installed in said intake manifold for regulating an intake air volume in said cylinder, said apparatus comprising:

an air flow meter installed upstream of the throttle valve in said intake manifold for detecting an air flowrate in said intake manifold, means for calculating the cylinder intake air volume per engine revolution at a predetermined interval from the air flowrate detected by said air flow meter, means for calculating the weighting average coefficient Fload based on the equation:

$$Fload = (Ve \cdot \eta \cdot Ne \cdot \Delta t)/(120 \cdot Vm)$$

wherein:
$\Delta t$ = calculation interval of air volume supplied to cylinder
$Vm$ = capacity of intake manifold
$Ve$ = engine displacement
$\eta$ = new air proportion in cylinder
$Ne$ = engine speed means for calculating a weighted average volume based on the intake air volume per engine revolution, the weighting average coefficient Fload and the weighted average volume calculated in the immediately preceding calculation cycle, means for correcting the value calculated by said weighted average volume calculating means based on a difference between this value and the value calculated in the immediately preceding calculation cycle, means for detecting engine load, means for judging whether or not the detected engine load is a high load equal to or above a predetermined constant, and means for outputting the value calculated by said weighted average volume calculating means as the actual cylinder intake air volume per engine revolution if it is judged that the engine load is high load, and for outputting the value corrected by said correcting means as the actual cylinder intake air volume per engine revolution if it is judged that the engine load is not high load.

6. An intake air volume detection apparatus for an engine provided with a cylinder, an intake manifold for guiding air into the cylinder and a throttle valve installed in said intake manifold for regulating an intake air volume in said cylinder, said apparatus comprising:

an air flow meter installed upstream of the throttle valve in said intake manifold for detecting an air flowrate in said intake manifold, means for calculating the cylinder intake air volume per engine revolution at a predetermined interval from the air flowrate detected by said air flow meter, means for calculating the weighting average coefficient Fload based on the equation:

$$Fload = (Ve \cdot \eta \cdot Ne \cdot \Delta t)/(120 \cdot Vm)$$

wherein:
$\Delta t$ = calculation interval of air volume supplied to cylinder
$Vm$ = capacity of intake manifold
$Ve$ = engine displacement
$\eta$ = new air proportion in cylinder
$Ne$ = engine speed means for calculating a weighted average volume based on the intake air volume per engine revolution, the weighting average coefficient Fload and the weighted average volume calculated in the immediately preceding calculation cycle, means for correcting the value calculated by said weighted average volume calculating means based on a difference between this value and the value calculated in the immediately preceding calculation cycle, means for detecting engine load, means for judging whether or not the detected engine load is a high load equal to or above a predetermined constant, means for comparing the value calculated by said weighted average volume calculating means and the cylinder intake air volume per engine revolution, and means for outputting the value calculated by said weighted average value calculating means as the actual intake air volume per engine revolution if it is judged that the engine load is high load and that the value calculated by said weighted average value calculating means is greater than the intake air volume per engine revolution, and outputting the value corrected by said correcting means as the actual intake air volume per engine revolution in all other cases.

* * * * *